Jan. 15, 1935. F. H. BARTZ 1,987,728

BRAKE OPERATING MECHANISM

Filed Feb. 15, 1932

Fred H. Bartz   Inventor

By   N. S. Amstutz   Attorney

Patented Jan. 15, 1935

1,987,728

UNITED STATES PATENT OFFICE 1,987,728

BRAKE OPERATING MECHANISM

Fred H. Bartz, Valparaiso, Ind.

Application February 15, 1932, Serial No. 592,871

4 Claims. (Cl. 188—10)

My invention relates to improvements in brake operating mechanism, and it more especially consists of the features pointed out in the claims.

The purpose of my invention is to simplify the adjustment of brakes in making compensation for the wear of brake bands; that eliminates the variable factor of ordinary lever movements as applied to the operation of brake bands by the substitution of segments or segment wheels; that also eliminates the usual adjustment of levers as the brake bands wear which adjustment must be made separately for each wheel that is subject to braking action; that is applicable to two or four wheels; and that overcomes the variable braking effect usually present when levers are depended upon.

With these and other ends in view I illustrate in the accompanying drawing such instances of adaptation as will disclose the broad underlying features of the invention without limiting myself to the specific details shown thereon and described herein.

Figures 1, 2:
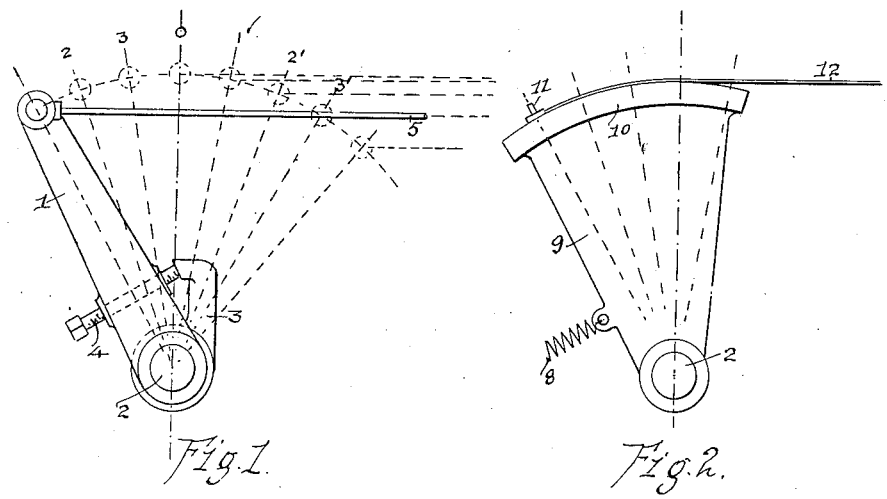
Figure 1 is an enlarged diagrammatic view showing an ordinary brake lever adjustment and the lack of uniformity of lever movement under different conditions of brake band wear.
Fig. 2 is an enlarged diagrammatic view showing how a uniform braking action is secured by means of a segment regardless of the extent of wear of the brake bands.

In installing my device I may use whatever alternatives or equivalents of construction that the exigencies of varying conditions may demand without departing from the broad spirit of the invention.

In the drawing an ordinary brake lever is indicated by the numeral 1. It is pivoted at 2 to any kind of cam action (not shown) adapted to draw the adjacent ends of external brake bands toward each other and separate the ends of internal brake bands (not shown). The housing to enclose the brake drum and brake bands may be of any desired type.

The arm or lever 1 is actuated by a link 5 connected to the foot pedal 7. Any desired form of retracting spring 8 may be combined with the rod 5, the pedal 7 or the lever 1 to release the brake. As ordinarily constructed each brake lever cooperates with a cam arm 3 through an adjusting screw 4. The cam arm is connected to a cam (not shown) which actuates the brake band as the lever 1 is moved by the foot pedal.

It is a well known mechanical feature in the use of levers that the most effective form of operation is in the center of its movement; that is, if the lever movement starts a considerable bit away from this point, each change of movement toward it gradually increases its effectiveness, while on the other hand as it gradually moves away from this point in the same direction the effectiveness of the movement is decreased, and it is to overcome this variable action that I have devised a system of segment control instead of a lever so that the action throughout the system will always be under the same degree of pull regardless of where the segment stands in relation to the actuated cam which operates upon the adjacent ends of the brake band.

The defect of the lever system is illustrated in Fig. 1 where the portion of movement of the lever to the left of the zero is indicated by 1, 2 and 3 representing different positions. The movement to the right of the zero is also indicated by 1', 2' and 3' for different positions of the lever. The dotted lines showing different positions of the rod 5 indicates where there is a gradual reduction of effectiveness as the lever is moved more and more to the right of the zero point.

In eliminating the variable actions of the lever 1, I substitute a segment 9, Fig. 2, also pivoted at 2. It has the arc of a circle 10 on which a cable 12 is secured at 11. It will be seen that the pull on the cable 12 will always transmit a uniform effectiveness on shaft 2 regardless of the angular position of the segment itself. That is, regardless of the ease of adjustment of the shaft 13 to equalize the pull at a point removed from the brake drums there is secured an effectiveness and uniformity of pull, which is absolutely dependable and does not have the variable effect that is present when a lever is used, similar to Figure 1.

There is no variation in the effectiveness of the pull of the cable 12 regardless of the extent of wear of the brake band. It will be understood that the pivot point 2 of the segment 9 is the same as that of the cam which operates the brake bands, as in the case of Fig. 1. The cables 12 reaching from the segments 9 are attached to other segments or wheels 14 secured on a shaft to which the foot pedal is attached through a link in which a turn-buckle 16 is placed for adjustment. These parts may be associated with any desired type of equalizing means. As the foot pedal normally moves through a given distance a stop 17 is used to limit its rearward movement.

It is pointed out that when the brake band wears sufficiently so as to cause the lever 1, Fig. 1, to not become effective until the numeral 3 is reached just before the zero line is reached, then, to set the brake it will be necessary to probably go as far as the numeral 3 to the right of the zero line. This increase in lever angle shows at once that the last portion of the brake action on the foot pedal is much less effective than when the lever is working at or near the vicinity of the zero line.

Figure 3:
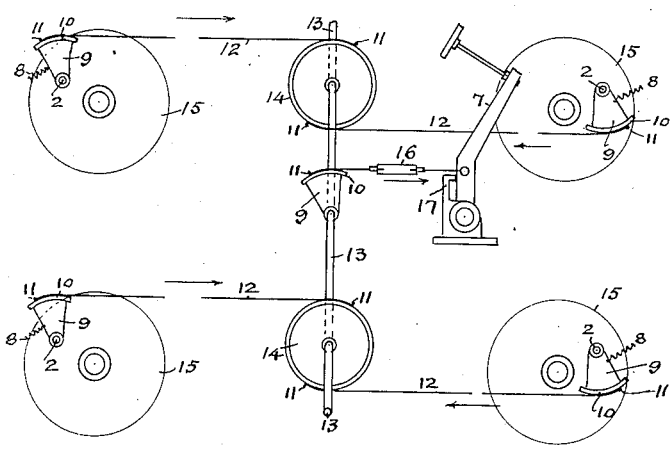
Fig. 3 is a diagrammatic view of the mechanical connections from two pairs of brake segments to a foot pedal.

Compensation for this variable condition can only be made by the adjustment of four set screws (4), one for each wheel, of lever 1, in engagement with the cam arm 3. This requires the services of a skilled mechanic and he usually makes several attempts before the desired equalization is accomplished. These adjusting means are usually in a very inaccessible place, in contrast to the ease of accessibility of the shaft 13, Fig. 3. However, the important point is to have a uniformly effective brake action as against the variable effective action when a lever is used.

The adjustment of my device requires no skill as a few turns of a turn-buckle 16 will restore the effectiveness of brake action.

It will be seen that in the use of my invention I am able to at all times have the same effective action on each brake regardless of the change or the amount of wear of the brake bands. However, adjustments that may be necessary can be made on the shaft 13 which can be positioned in an easily accessible place on the chassis of the car or truck.

My invention may be applied with equal success to two or four wheel brakes. It is immaterial as to the exact way the invention is applied because there are many variations that may be followed according to the structure of the chassis of a specific car or truck. It will be seen that the outstanding features of my system is the elimination of the variable action of any kind of brake that uses a lever arm to operate the brake bands and the use of one adjustment which is easily made compared to four adjustments necessary with a lever system. If the brake bands have become worn to such an extent that when the lever 1 must be moved beyond the position 3 at the right of the zero line it is quite apparent that each additional amount that it must be moved in this direction will reduce the effectiveness of pull, so that, if continued, very shortly the braking action will be gradually reduced to the point where there will be practically no effect upon the brake within the drum 15. In this way there is created a hazard not alone to the driver of the car or truck or delivery wagon but also a liability that the vehicle itself may be damaged because in an emergency the brakes can not be used.

What I claim is:

1. In a device to compensate for the wear of brake bands on an automobile, a foot pedal for operating the brakes, a connection from the foot pedal to a single shaft having separate segments adapted to operate the brake bands, a pivoted segment at each brake having a periphery constituting the arc of a circle, and means for attaching the connection from the foot pedal to the arc of one of the segments on said single shaft whereby regardless of the wear of the brake bands there will always be the same uniform effective action of the brake for a given movement of the foot pedal.

2. In brake operating mechanisms, a foot pedal, a segment suitably attached to a single shaft, such segment having a portion of its circumference comprising an arc of a circle to which and from which an attachment is made to the foot pedal, a pair of disks on the said shaft, a segment for the brake of each rear wheel, a segment for the brake of each front wheel, a separate connection from each rear wheel segment to one portion of the periphery of each disk on the shaft, a separate connection from each front wheel segment to a point on the periphery of each disk on the shaft approximately opposite the point of attachment of the connections from the rear wheel segments on said disk, means adjacent the foot pedal to compensate for any wear to which the separate brakes may be subjected, and separate springs associated with each segment to release the brakes in opposition to the movement of the foot pedal in setting the separate brakes.

3. In a device of the character described, a brake segment, a hub forming a pivotal point, an arc of a circle forming the periphery of the segment, a spring to pull the segment in one direction, a disk on a single shaft, a connection from the periphery of the segment to the disk on the single shaft, a segment on the same shaft, a foot pedal, and means between the foot pedal and the shaft segment for adjusting the starting and ending of the movement of the brake segment to a predetermined point.

4. An operating segment for actuating the brake bands of automobiles, comprising a segment for each wheel having a pivotal point and a periphery shaped as an arc of a circle of a given radius from the pivotal point, a spring for each segment to release its brake, a single shaft, a pair of disks on the shaft, a foot pedal, a connection from the foot pedal to the segment on said shaft, and separate connections from the disks to the arc of each wheel segment to set the brakes, and means between the foot pedal and the shaft segment for adjusting the movement of the foot pedal to compensate for whatever wear there may occur on the different brake bands.

FRED H. BARTZ.